Dec. 4, 1923.                                                    1,476,114
G. D. SUNDSTRAND
LATHE AND TAPER CUTTING MEANS FOR THE SAME
Filed June 7, 1919                          2 Sheets-Sheet 1
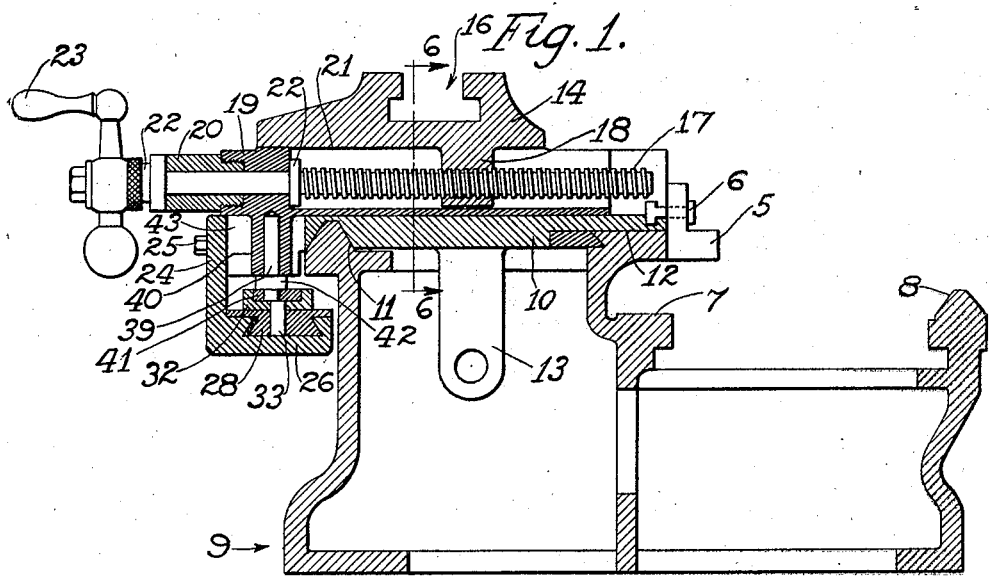
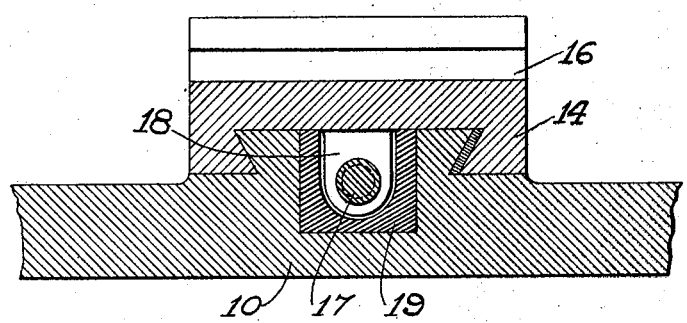
INVENTOR
Gustaf D. Sundstrand.
BY
Miller, Chindahl & Parker
ATTORNEYS Dec. 4, 1923.
G. D. SUNDSTRAND
LATHE AND TAPER CUTTING MEANS FOR THE SAME
Filed June 7, 1919
1,476,114
2 Sheets-Sheet 2
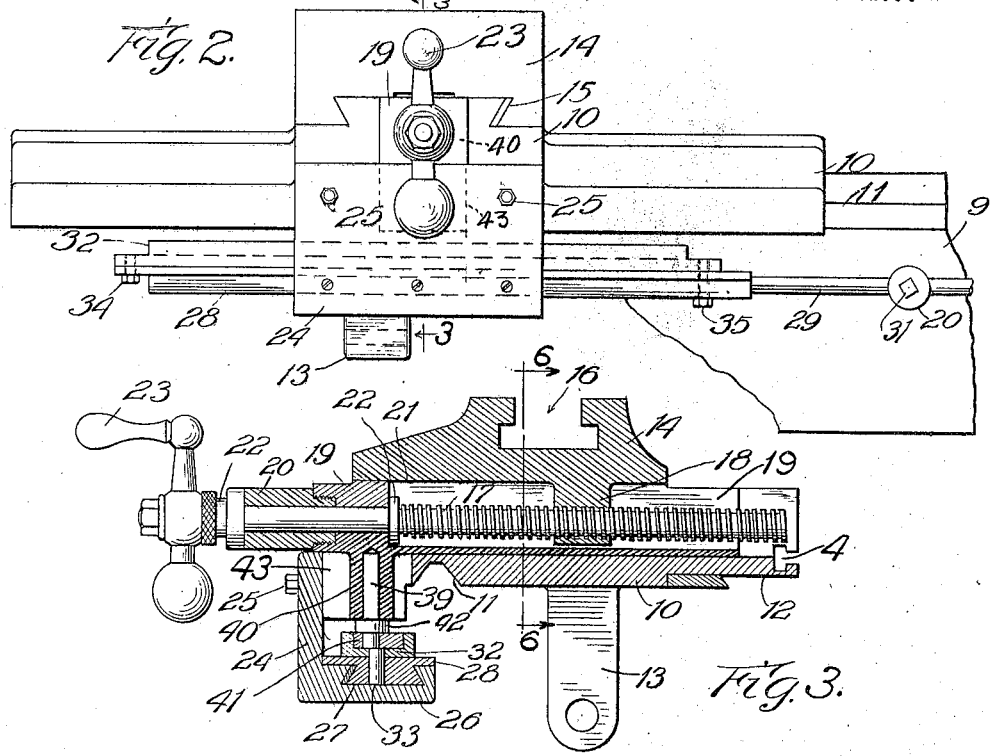
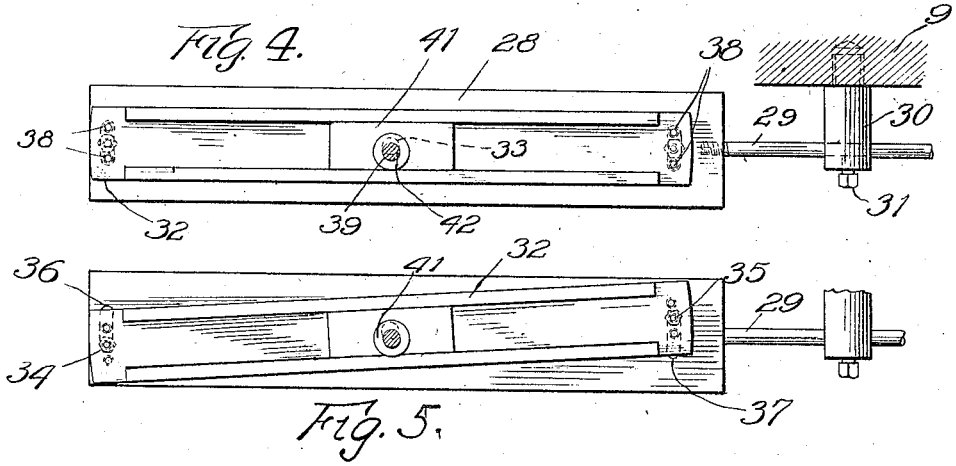
Inventor
G. D. Sundstrand
By Miller, Chindahl & Parker
Attys Patented Dec. 4, 1923.

1,476,114

UNITED STATES PATENT OFFICE.

GUSTAF DAVID SUNDSTRAND, OF ROCKFORD, ILLINOIS, ASSIGNOR TO ROCKFORD TOOL COMPANY, OF ROCKFORD, ILLINOIS, A CORPORATION OF ILLINOIS.

LATHE AND TAPER-CUTTING MEANS FOR THE SAME.

Application filed June 7, 1919. Serial No. 302,495.

*To all whom it may concern:*

Be it known that I, GUSTAF DAVID SUNDSTRAND, a citizen of the United States, residing at Rockford, in the county of Winnebago and State of Illinois, have invented certain new and useful Improvements in Lathes and Taper-Cutting Means for the Same, of which the following is a specification.

My invention relates to engine lathes and more specifically to an improved lathe embodying means for cutting a taper.

In cutting tapers in an engine lathe, it has been common to fasten a slotted member on the rear of the lathe and mount a roller on the cross feed attachment to engage the slot in said member. In using such devices it is often necessary to take out or disconnect one cross feed screw and also the workman must go behind the machine to set the taper.

One of the objects of my invention is to provide a taper cutting device on the front of the lathe where it may be conveniently adjusted. This, moreover, is necessary where the lathe is equipped with a rear tool, such, for instance, as that described in my copending application, Serial No. 212,393, filed January 18, 1918.

Another object is to locate the taper device under the projecting front carriage where it will be protected from dirt.

Other objects and advantages of my invention will become apparent as the description proceeds.

In the accompanying drawings, Figure 1 is a section of a lathe showing an application of my invention. Fig. 2 is a side view of the parts shown in Fig. 1. Fig. 3 is a section on the line 3—3 of Fig. 2. Fig. 4 is a plan view of the taper guide and table, and Fig. 5 is a similar view with the guide set at an angle. Fig. 6 is a section somewhat enlarged on the line 6—6 in Figs. 3 and 1.

Referring to Figs. 1, 2 and 3, 10 indicates a tool carriage adapted to engage guideways on the lathe bed 9 at 11 and 12. As shown in Fig. 1 the lathe bed also has a set of rear ways 7 and 8 adapted to support another carriage equipped with any suitable attachment such, for instance, as the rear tool described in my copending application, Serial No. 293,868 filed April 30, 1919.

The carriage 10 may have a T slot 4 for the attachment of a cam 5 by suitable bolts 6. The cam 5 is adapted to actuate any desired mechanism, an example of which is described and illustrated in my copending application, Serial No. 293,868, herein above referred to.

A projection 13 on the carriage 10 is adapted to engage a feed screw for feeding the carriage longitudinally of the lathe bed manually or by power, as described and illustrated in detail in my copending application, Serial No. 212,393, filed January 18, 1918. A tool carrier or support 14 is mounted to slide on the guide 15 extending transversely of the carriage 10.

The tool support 14 is provided with a longitudinal T-shaped slot 16 to receive a suitable tool rest (not shown). The means for moving the tool support 14 upon its guide 15 includes a cross-feed screw 17 engaging a lug 18 extending downwardly from the tool support 14.

In cutting a taper, the tool support 14 is automatically moved on its guide 15 during the travel of the carriage 10 along the lathe bed. In order that the tool support may be thus moved without disconnecting the cross-feed screw 17, said screw is mounted in a slidable bearing member consisting, in the present embodiment, of a block 19 and a circular boss 20 attached to said block, the former being slidable in a guideway 21 extending transversely of the carriage 10. The block 19 extends across under the tool support 14 and is cut away to a U-shape, as clearly shown in Figs. 3 and 6 throughout a substantial portion of its length to accommodate the lug 18 in its sliding movement. The forward portion of the cross-feed screw 17 is rotatably mounted in said bearing member and is held against endwise movement in said bearing member by suitable collars 22. A handle 23 is attached to the forward end of the cross-feed screw 17 for manual transverse movement of the tool support.

Means is provided for automatically moving the bearing member 19, 20 when a taper is to be cut. This means will now be described.

An apron 24 is attached to the front of the carriage 10 by suitable screws 25 and has a rearwardly extending projection 26 containing a guideway 27. A table 28 is mounted in the guideway 27 and is arranged to be detachably fixed to the lathe bed 9 by means consisting, in the present embodiment, of a rod 29 fixed to said member and slidably extending through an apertured stud 30 attached to the bed, a set screw 31 being provided to clamp the rod 29 in the stud 30.

On the table 28 is pivotally mounted a guide member 32 having upwardly projecting parallel walls defining a rectangular channel. The pin 33 that forms the pivot for the guide member 32 is situated midway of the length of said guide member. Bolts 34 and 35 passing through slots 36 and 37 in the member 28 are adapted to clamp the guide member 32 in adjusted angular position. Additional bolt holes 38 laterally spaced in the guide member 32 are adapted to receive the bolts 34 and 35 to extend the range of adjustment of said guide member.

The operative connection between the bearing member 19, 20 and the guide member 32 will now be described. A block or follower 41 is carried along by a pin 39 and slides in the guide member 32. The pin 39 carries an enlargement 42 holding the block in place and enters a depending lug or projection 40 formed integral with the block 19. The carriage 10 has a slot 43 in which the projection 40 is slidably mounted. Said projection bears against the side walls of the slot 43.

In the operation of my device with the set screw 31 tightened, the table 28 and the guide 32 remain stationary. As the carriage 10 travels, the block 41 slides in the guide 32 and forces the pin 39 to move, and with it the block 19, tool support 14 and the cutting tool, thus cutting the desired taper. When it is desired not to use the taper attachment, set screw 31 may be loosened. The slide 28 and guide 32 will then move with the apron 24 and the block 19 will be effectively locked from transverse movement.

While I have described in detail one embodiment of my invention, it should be clearly understood that the description is illustrative only, and that all legitimate modifications and improvements covered by the subjoined claims are properly within the scope of my invention.

I claim as my invention:

1. A lathe having, in combination, a longitudinally slidable carriage, transverse ways on said carriage, a bearing block slidable in said ways, the upper portion of said bearing block being slotted, additional transverse ways on said carriage, a tool support on said additional ways, said tool support having a lug entering the slot in said bearing block and adapted to engage a feed screw.

2. A lathe having, in combination, a longitudinally slidable tool carriage; a tool support transversely slidable on said carriage; a cross-feed screw extending below said tool support; a depending lug on said tool support engaging said cross-feed screw; a bearing block supporting said cross-feed screw at one end and having an extension underlying said screw, said extension being cut away to provide clearance for said lug.

3. A lathe having, in combination, a longitudinally slidable carriage, a transverse groove in said carriage, a transversely slidable bearing block in said groove, a pair of transverse ways on said carriage on opposite sides of said groove, a tool holder slidable on said ways and overlying said block, and an operative connection between said block and said tool holder.

4. A lathe having, in combination, a longitudinally slidable carriage, a transversely slidable tool support on said carriage, a transversely slidable block mounted in said carriage and extending through the same underneath said tool support, means for adjusting the transverse spacing of said bearing block and tool support, and a taper attachment operatively connected to said transversely slidable block.

5. A lathe having, in combination, a longitudinally slidable carriage, a transversely slidable block in said carriage, and a transverse feed screw supported by and housed in said block.

6. A lathe having, in combination, a longitudinally slidable carriage, a transversely slidable block in said carriage, a tool support transversely slidable on said carriage over said block, a transverse feed screw journalled at one end in said block and extending through a groove formed in the upper face of the block, and a lug depending from said tool carriage having threaded engagement with an intermediate portion of said feed screw, the other end of said feed screw being free and unsupported.

7. A lathe having, in combination, a longitudinally slidable carriage, a transversely slidable block in said carriage having a U-shaped recess running substantially its full length, a feed screw rotatably mounted in the block and positioned in said recess, a transversely slidable tool support mounted in said carriage and overlying said block, said support having a lug projecting into said recess in threaded engagement with said screw.

In testimony whereof, I have hereunto set my hand.

GUSTAF DAVID SUNDSTRAND.